United States Patent [19]
Hager

[11] 3,914,738
[45] Oct. 21, 1975

[54] MOTOR VEHICLE ALARM SYSTEM
[76] Inventor: Louis Alphonso Hager, 2432 Bay St., Charlotte, N.C. 28205
[22] Filed: June 24, 1974
[21] Appl. No.: 482,013

[52] U.S. Cl............... 340/63; 340/274 R; 200/61.52
[51] Int. Cl.² ......................................... B60R 25/10
[58] Field of Search ..... 340/63, 64, 65, 215, 274 R, 340/282, 287; 307/10 AT; 200/61.47, 61.52, 61.61, 61.63, 61.7, 61.81, 61.83, 61.93, 61.45 R

[56] References Cited
UNITED STATES PATENTS
393,558   11/1888   Harms............................. 200/61.47
2,344,129  3/1944   Clayton........................... 200/61.47

Primary Examiner—Alvin H. Waring
Attorney, Agent, or Firm—Herbert M. Adrian, Jr.

[57] ABSTRACT

An alarm system for the gasoline supply of a motor vehicle is described wherein an alarm is triggered when access to the gasoline supply for the motor vehicle is attempted. The system is operated preferably utilizing the motor vehicle horn and the vehicle electrical storage battery. The system is operated entirely independent of the motor vehicle ignition system and can be activated or deactivated independent of said ignition system. An alarm is sounded by means of the motor vehicle horn when the access panel leading to the gasoline storage tank is moved, in the opening direction, a predetermined distance from the closed position, thereby completing an electrical circuit through a mercury switch which affects the sounding of the motor vehicle horn.

6 Claims, 3 Drawing Figures

MOTOR VEHICLE ALARM SYSTEM

This invention relates to a security system for motor vehicles and more particularly to a security system for protecting the gasoline storage tank of motor vehicles such as automobiles, trucks, buses and the like.

BACKGROUND OF THE INVENTION

In recent months, the shortage of gasoline supplies and the rapidly rising cost of gasoline has resulted in the need to more carefully safeguard the gasoline supply of motor vehicles. With increased cost of gasoline, it becomes increasingly tempting to thieves to siphon gasoline from motor vehicle storage tanks as the vehicles remain unattended.

Various devices have been proposed to reduce theft. Locking gasoline caps, siphon restricting means and the like have been made available to motor vehicle owners. While each of these means has provided a useful function, limitations in their total effectiveness are also recognized as well as the inconvenience in their use. For instance, locking gasoline caps becomes inconvenient to the owner each time gasoline is added to the storage tank. Additionally, the loss or misplacement of the key can have catastrophic results. Other security means likewise have deficiencies and/or limitations in the security which they provide as well as the convenience or inconvenience produced by their use.

It is an object of the present invention to provide a simple alarm system capable of operating on most motor vehicles, which system is operated independent of the ignition system of the automobile.

It is another object of the present invention to provide an alarm system which utilizes the motor vehicle horn system as a part of the alarm system.

It is a further object of the present invention to provide a gasoline storage alarm system which is operated independent of the ignition system of the automobile and which can utilize either the automobile's existing electrical supply system or an independent electrical supply source.

It is yet another object of the present invention to provide an alarm system for motor vehicle gasoline storage tanks which can be activated or deactivated by the motor vehicle operator independent of the automobile ignition system and which will automatically shut off the alarm when the access panel is returned to the closed position.

These and other objects of the present invention will become readily apparent to those skilled in the art from the description of the invention which follows:

THE INVENTION

An electrical alarm system for a motor vehicle gasoline supply tank is provided comprising a mercury contact switch, an electrical connection between the motor vehicle horn, an electrical energy supply and said mercury switch, means for mounting said mercury switch in an angle position on a movable access panel to said gasoline supply tank, said mounting being positioned such that the movement of said panel causes the tilting of said mercury switch to complete an electrical circuit between the electrical supply and horn, thereby sounding said horn.

The present invention provides a simplified means for sounding the motor vehicle horn when the access panel to the gasoline supply is moved a predetermined distance in the opening direction. A return of the panel to the closed position deactivates the sounding of the horn, thereby saving the owner the inconvenience of returning to his vehicle to shut off the horn once it has been activated. The frightening sound of the horn going off is normally sufficient to stop the theft from being accomplished. Since most motor vehicles have access panels, such as a license plate cover or hinged door panel over the gasoline supply cap, the present system can be utilized with most motor vehicles.

DETAILS OF THE INVENTION

The invention will be more fully described by reference to the drawings wherein.

Figure 1:
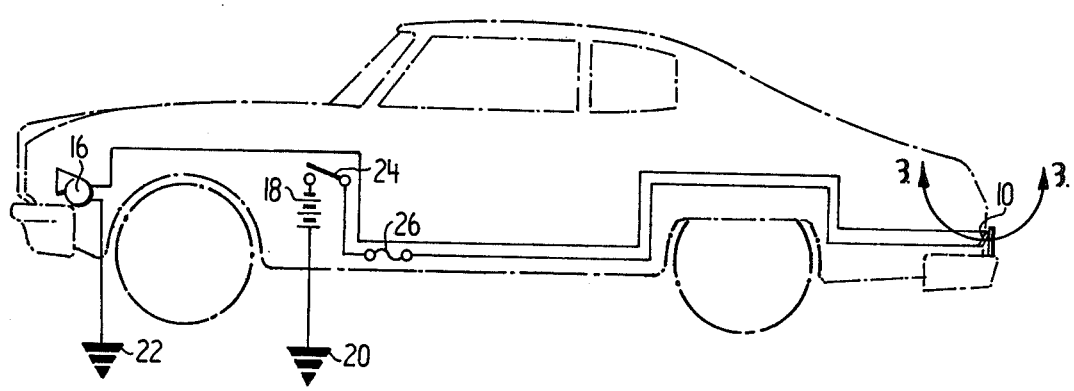
FIG. 1 is an exposed elevation view of a motor vehicle showing schematically the wiring diagram of the present invention in place in the vehicle.
Figure 2:
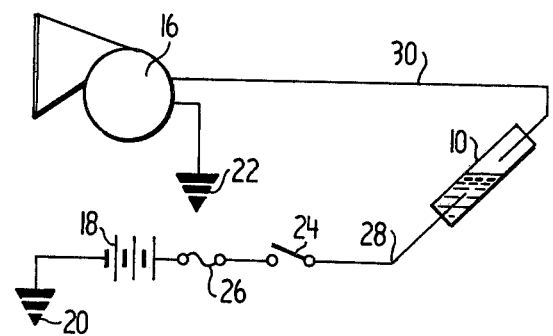
FIG. 2 is an enlarged schematic diagram of one embodiment of the electrical system for the present invention.
Figure 3:
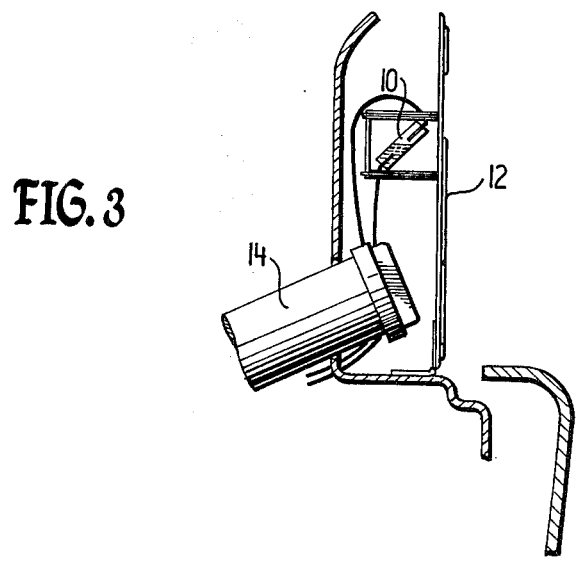
FIG. 3 is an enlarged sectional view along line 3 — 3 of FIG. 1 illustrating in greater detail the mounting of the mercury triggering system for the alarm of the present invention.

The present alarm system is particularly adopted for use with motor vehicles such as the automobile. As such, the invention will be described more particularly with this in mind. As can be recognized from the drawings, the alarm system of the present invention utilizes a mercury switch 10 which is mounted in an angled position from the horizontal such that a predetermined tilting of the mercury switch 10, as is effected by the movement of the access panel plate 12 to the gasoline storage tank 14, causes mercury to complete electrical contact in the circuit thereby activating horn 16. Electrical power for the alarm system can conveniently utilize the automobile battery 18. If desired, a separate electrical system can be utilized but such is unnecessary. Battery 18 has one terminal grounded 20 to the automobile body which is utilized to complete the electrical circuit to horn ground 22. Switch 24 is utilized to break the circuit when the alarm system is deactivated and not needed. This prevents accidental sounding of the alarm system such as when fuel is being added to the storage tank.

Fuse 26 is preferably provided to prevent damage to the electrical system. Wire 28 forms one end of mercury contact switch 10 while return wire 30 provides the completion of the circuit to horn 16.

The electrical system, including wiring, fuse and mercury switch, are of high amperage capacity so as to be capable of handling the relatively high amperage of up to about 100 amperes which can be produced in automobile electrical systems. Low amperage systems cannot be utilized unless a separate electrical power system is used or a protective resistor or other means are provided. Of course, the process is operable on either 6 or 12 volts as is common in automobile electrical systems. If the vehicles own horn and electrical supply is used, the voltage is irrelevant to the invention. If a separate electrical supply is to be utilized, adjustment for the voltages and amperages of such supplies may be needed.

The mercury switch used herein is of a nonsparking type of required amperage capacity. Such switches are readily available from many commercial and retail sources. The switches are commonly constructed of a sealed glass tube partially filled with mercury. Electrical contact terminals extend from opposite ends of the tube terminating a spaced distanced from each other. When the tube of mercury is tilted a predetermined distance from the vertical, the mercury moves to complete electrical contact between the spaced apart terminals.

In installation, the switch is mounted at an angle so that on movement of the access panel on the order of 20° to 30° from its closed position, the mercury switch will complete the circuit and activate the horn. On return of the panel to its closed position, deactivation of the horn is automatically effected. This is particularly desirable since the first blast from the horn will invariably frighten a thief away. If the horn were to continue to sound, the owner would be required to return to his automobile to deactivate the horn less the power supply be depleted, thereby incapacitating the automobile.

The description and drawings have been directed more particularly to access panels which are normally covered by a license plate. However, the same basic principle can be utilized, for instance with access panels which are on the side of the automobile. The mounting of the mercury switch on the panel is dependent upon the direction of movement of the panel into the open position. Where the panel moves from the vertical to the horizontal position or vice versa, the mounting is similar to that illustrated for the license plate mounting. Where the access panel moves in a hinged manner perpendicular to the vertical, the mercury switch can be mounted so as to drop or move, either by springs or gravity, out of the vertical position as the access panel is moved, again completing the electrical circuit and activating the alarm system.

While the invention has been described more particularly with respect to preferred embodiments thereof, it will be recognized that various modifications can be made to the invention without departing from the spirit thereof. As such, it is intended to cover the invention broadly, being limited only by the appended claims.

What is claimed is:

1. An alarm system for a motor vehicle gasoline supply tank comprising a mercury contact switch, electrical connection between the motor vehicle horn, an electrical energy supply and said mercury switch means for mounting said mercury switch in an angled position on a movable access panel to said gasoline supply tank, said mounting being positioned such that the movement of said panel causes the tilting of said mercury switch to complete an electric circuit between the electrical supply and horn thereby sounding said horn.

2. The alarm system of claim 1 wherein the electric circuit has switch means to interrupt said circuit and deactivate the system.

3. The alarm system of claim 1 wherein the gasoline supply has access behind a hinged license mounting plate and said mercury contact switch is mounted on said plate.

4. The alarm system of claim 1 wherein the gasoline supply has access behind a hinged cover plate and said mercury contact switch is mounted so as to tilt into an electrical connection on opening said cover plate.

5. The alarm system of claim 1 wherein the mercury switch is mounted at an angle from the vertical so as to complete an electrical connection on moving said access panel more than about 20° toward the open position.

6. The alarm system of claim 1 wherein the electrical system is independent of the vehicle ignition system.

* * * * *